United States Patent [19]

Hummel et al.

[11] Patent Number: 5,156,447

[45] Date of Patent: Oct. 20, 1992

[54] HYDRAULIC VEHICLE BRAKE SYSTEM WITH ANTI-SKID AND TRACTION CONTROL APPARATUS

[75] Inventors: Rolf Hummel, Steinenbronn; Michael Klose, Besigheim; Klaus Mueller, Tamm, all of Fed. Rep. of Germany

[73] Assignee: Robert Bosch GmbH, Stuttgart, Fed. Rep. of Germany

[21] Appl. No.: 729,312

[22] Filed: Jul. 12, 1991

[30] Foreign Application Priority Data

Aug. 3, 1990 [DE] Fed. Rep. of Germany ....... 4024627

[51] Int. Cl.⁵ ..................... B60T 8/32; B60T 8/48; B60K 28/16
[52] U.S. Cl. ..................... 303/113 TR; 303/116 R; 303/119 R; 303/DIG. 5
[58] Field of Search ...... 303/113 TR, 113 R, 113 TB, 303/116 R, 116 SP, 116 WP, 116 PC, 110, 100, 10, 119 R, 119 SV, 84.2, 84.1, DIG. 1, DIG. 2, 117, DIG. 5; 180/197; 188/181 C, 181 A

[56] References Cited

U.S. PATENT DOCUMENTS

| | | |
|---|---|---|
| 4,720,151 | 1/1988 | Belart et al. ................. 303/84.2 X |
| 4,726,630 | 2/1988 | Krohn et al. ................. 303/119 R |
| 4,750,788 | 6/1988 | Seibert et al. ................. 303/116 SP |
| 4,861,116 | 8/1989 | Bernhardt et al. ............ 303/113 TR |
| 4,861,118 | 8/1989 | Burckhardt et al. .......... 303/113 TR |
| 4,898,430 | 2/1990 | Becker-Endrigkeit et al. .... 303/113 TR |
| 4,900,102 | 2/1990 | Tonner et al. ................. 303/110 |
| 4,902,075 | 2/1990 | Uno et al. ................. 303/119 SV |
| 4,940,293 | 7/1990 | Burckhardt et al. .......... 303/113 TR |
| 5,026,127 | 6/1991 | Arikawa ................. 303/119 R |

FOREIGN PATENT DOCUMENTS

| | | | |
|---|---|---|---|
| 0303261 | 2/1989 | European Pat. Off. ......... 303/116 R |
| 2169975 | 7/1986 | United Kingdom ............ 303/116 R |

*Primary Examiner*—Douglas C. Butler
*Attorney, Agent, or Firm*—Edwin E. Greigg; Ronald E. Greigg

[57] ABSTRACT

An apparatus having a self-aspirating pump, with which, in a traction control mode, pressure fluid can be aspirated through an intake line from a pressure fluid supply tank of a master brake cylinder. Located in the intake line is a control valve that assumes its preferred blocking positoin and can then be switched into its open position by a pressure pulse generated by the pump, through a control line. This open position can be switched whenever a control valve, located in the brake line of the master brake cylinder, is switched by an electronic control unit of the control apparatus out of its preferred position thereby connecting the master brake cylinder to the wheel brake cylinders into another position, thereby carrying pump pressure to the control valve. Aspiration of pressure fluid from the supply tank is thus avoided upon pump startup with undesirable feeding. This prevents the production of noise from the pumping of pressure fluids into the master brake cylinder.

5 Claims, 2 Drawing Sheets

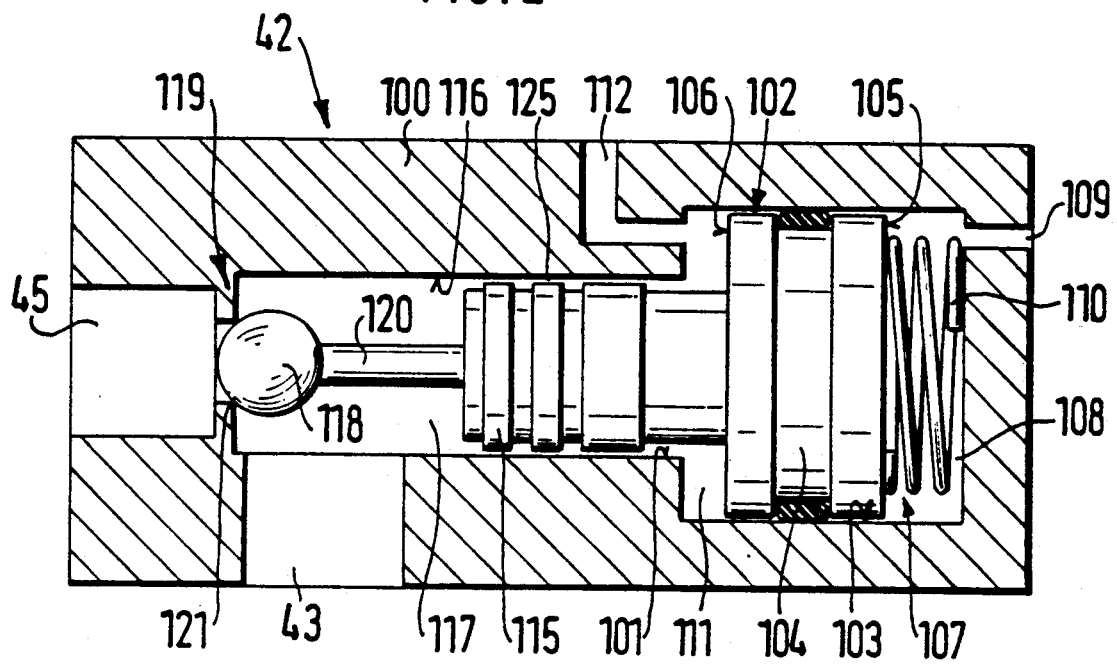
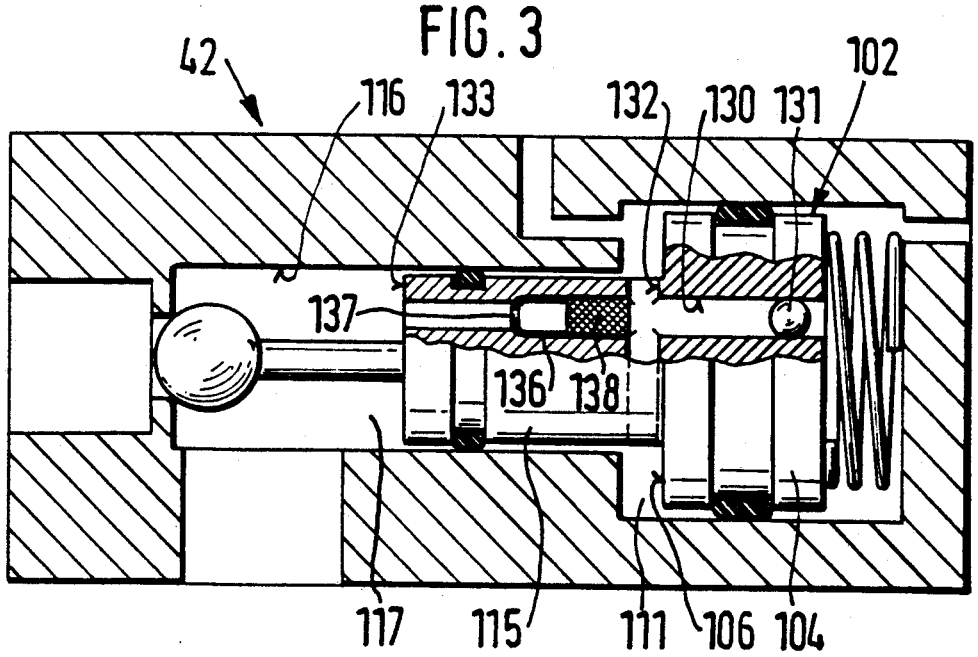

HYDRAULIC VEHICLE BRAKE SYSTEM WITH ANTI-SKID AND TRACTION CONTROL APPARATUS

BACKGROUND OF THE INVENTION

The invention is based on a hydraulic vehicle brake system. Such a brake system is already known (German Offenlegungsschrift 38 16 073, FIG. 1 U.S. Pat. No. 4,900,102), in which the first control valve in the brake line between the master brake cylinder and the connection of the feed line brought from the outlet side of the pump has a preferred position, namely in which it is switched to be open by spring actuation. The second control valve in the intake line leading from the pressure fluid supply tank to the pump inlet side also has a preferred, spring-actuated open position. Also connected to this intake line is a pressure fluid reservoir that serves to hold pressure fluid drawn from the wheel brake cylinders. In certain brake system operating states, in which the function of the anti-skid or traction control apparatus is being checked, or if the vehicle hits a pothole or a driven vehicle wheel lifts away from the road, or after a pedal-actuated braking with anti-skid control the pump is set into operation or its function is maintained, so that it can aspirate pressure fluid from the pressure fluid supply tank and pump it into the master brake cylinder. However, this pumping of brake fluid is undesirable because it contributes to the production of noise in the passenger compartment of the vehicle.

OBJECT AND SUMMARY OF THE INVENTION

The vehicle brake system according to the invention has the advantage over the prior art that the disruptive pumping of brake fluids into the master brake cylinder is prevented in a simple manner, because the second control valve can now be switched into its open position permitting the aspiration of brake fluid from the brake fluid supply tank only if the first control valve, in traction control operation, is shifted by the control unit to its electromagnetically switchable position. In the operating states referred to above in which undesirable pumping takes place, contrarily, the intake line is interrupted by the second control valve, because the pump pressure cannot act upon the actuating means of this control valve. On the other hand, if the pump pressure in the traction control mode has actuated the second control valve, then once pumping of pressure fluid has been completed, the pump pressure in the control line can be relieved via the throttle in the compensation line, so that upon pedal-actuated braking, the second control valve can be transferred into its blocking position by the brake pressure produced.

Other features of the invention provide for a control valve that is simple in design, can be manufactured economically, and is reliable in function.

The throttle and the compensation line are advantageously integrated in the control valve without additional components, which simplifies the design of the brake system.

In one embodiment of the control valve, its stepped piston contains the throttle and the compensation line, operationally with a filter. This stepped piston, with built-in parts, can advantageously be tested prior to being installed in the valve housing.

The invention also provides for simple compensation of negative pressure in the intake line, so that the next time the pump starts up, it can again aspirate pressure fluid to generate a pressure pulse for switching the second control valve to the opening position.

The invention will be better understood and further objects and advantage thereof will become more apparent from the ensuing detailed description of preferred embodiments taken in conjunction with the drawings.

BRIEF DESCRIPTION OF THE DRAWINGS

FIG. 2 shows a first exemplary embodiment of the control valve, with a stepped piston for actuating a seat valve and with a throttle gap between one piston part and a housing bore; and FIG. 3 shows a second exemplary embodiment of the control valve, with a throttle integrated with the stepped piston.

DESCRIPTION OF THE PREFERRED EMBODIMENTS

Figure 1:
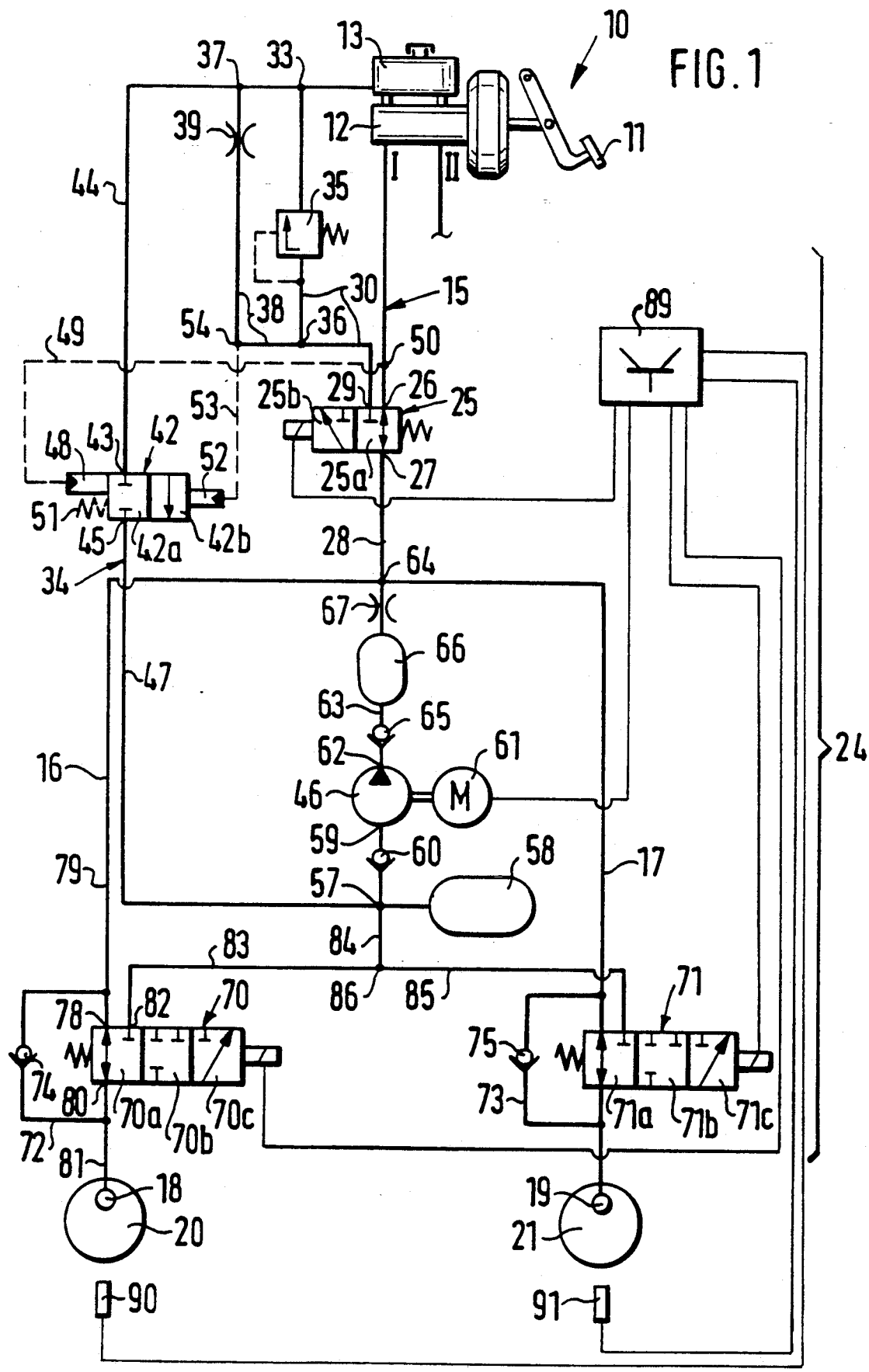
FIG. 1 is a fragmentary circuit diagram of a hydraulic vehicle brake system, having a control valve in an intake line between a pressure fluid supply tank and a pump.

The hydraulic vehicle brake system 10 shown in FIG. 1 of the drawing has a master brake cylinder 12 for two brake circuits I and II that can be actuated by a brake pedal 11. A pressure fluid supply tank 13 is mounted on the master brake cylinder 12. Brake circuit I, described below, has a brake line 15 that branches into two line branches 16 and 17. Each of these lead to one wheel brake cylinder 18 or 19 for the wheel brakes 20 or 21 of driven vehicle wheels, not shown.

The vehicle brake system 10 is equipped with an anti-skid and traction control apparatus 24. This apparatus has a first control valve 25, in the form of a 3/2-way valve, disposed in the brake line 15. The first control valve 25 has a first connection 26 for the brake line 15 arriving from the master brake cylinder 12; a second connection 27, for the brake line segment 28 leading to the brake line branches 16, 17; and a third connection 29 for an overflow line 30. As shown, the first control valve 25 assumes a spring-actuatable preferred switching position 25a, in which the first connection 26 and the second connection 27 communicate with one another. Contrarily, in a second, electromagnetically switchable position 25b of the first control valve 25, communication exists between the second connection 27 and the third connection 29.

The aforementioned overflow line 30 is connected at point 33 to an intake line 34 beginning at the pressure fluid supply tank 13. Pressure-limiting means 35 in the form of a pressure-limiting valve are disposed in the overflow line 30. Between the first control valve 25 and the pressure limiting means 35, a compensation line 38 having a throttle 39 leads from point 36 of the overflow line 30 to the connection point 37 of the intake line 34.

A second control valve 42 in the form of a 2/2-way valve is located in the intake line 34. The second control valve 42 has a first connection 43 for the intake line segment 44 leading to the pressure fluid supply tank 13. A second connection 45 of the control valve 42 communicates with the intake line segment 47 leading to a pump 46. The second control valve 42 has a blocking position 42a switchable by hydraulic actuating means 48. The actuating means 48 communicates, through a first control line 49, with the brake line 15 at point 50 between the first control valve 25 and the master brake cylinder 12. As indicated by dashed lines, the blocking position of the second control valve 42 can also be produced by an actuating spring 51. The second control valve 42 also has an open position 42b, in which the first connection 43 and the second connection 45 of the intake line 34 communicate with one another. This hydraulic position can be switched by hydraulic actuating means 52. To this end, the hydraulic actuating means 52 communicates with a compensation line 38 through a second control line 53 at point 54.

Between the second control valve 42 and the pump 46, a pressure fluid reservoir 58 is connected to the intake line 34 at point 57. A check valve 60 with an open position from point 57 to the inlet side 59 of the pump 46 is located between this connection point 57 and the inlet side 59 of the pump 46, at which the intake line 34 ends. The pump 46 is embodied as self-aspirating and can be driven by an electric drive motor 61. A feed line 63 that ends at the branching point 64 of the brake line 15 begins at the outlet side 62 of the pump. A check valve 65 having an opening position from the pump 46 to the brake line 15, a damper chamber 66, and a throttle 67 are located in the feed line 63, beginning at the outlet side 62 of the pump 46.

A pressure control valve assembly 70 and 71, respectively, each in the form of a 3/3-way valve, are located in the respective brake line branches 16 and 17. A bypass line 72 and 73 having a respective check valve 74 and 75 are disposed parallel to each of the two pressure control valve assemblies 70 and 71; the check valve open in the direction from the respective wheel brake cylinder 18 or 19 to the master brake cylinder 12.

Since both pressure control valve assemblies 70 and 71 are identically embodied, only the pressure control valve assembly 70 will be described hereinafter. It has a first connection 78 for the segment 79 of the brake line branch 16 leading to the brake line 15. A second connection 80 of the pressure control valve assembly 70 communicates with the segment 81 of the brake line branch 16 leading to the wheel brake cylinder 18. A branch 83 of a return line 84 leading to the point 57 of the intake line 34 begins at a third connection 82 of the pressure control valve assembly 70. A return line branch 85 correspondingly connected to the pressure control valve assembly 71 communicates at point 86 with the return line 84.

The pressure control valve assembly 70 (like the pressure control valve assembly 71) has a preferred, spring-actuatable switching position 70a, in which the connections 78 and 80 communicate with one another but the connection 82 is blocked. The pressure control valve assembly 70 also has a second position 70b with blocked connections 78, 80 and 82. In a third position 70c, contrarily, the connections 80 and 82 communicate with one another, while the connection 78 is blocked. Positions 70b and 70c can be generated electromagnetically. The pressure control valve assembly 71 in the brake line branch 17 has corresponding positions 71a, 71b and 71c.

The pressure control valve assemblies 70 and 71 may also—as known—be each embodied as two 2/2-way valves, instead of being embodied as 3/3-way valves.

Finally, the anti-skid and traction control apparatus 24 has an electronic control unit 89, with which in accordance with a control algorithm stored in it, the first control valve 25, the drive motor 61 of the pump 46 and the pressure control valve assemblies 70 and 71 are switched as a function of the wheel rotation behavior, which can be detected by rpm sensors 90 and 91 assigned to the vehicle wheels, not shown.

Brake circuit II, not shown, may be equipped with a anti-skid apparatus for other vehicle wheels.

The hydraulic vehicle brake system 10 has the following function:

Upon driver-initiated braking, brake pressure is generated in the master cylinder 12 by actuation of the brake pedal 11 and is transmitted in brake circuit I through the brake line 15 and the brake line branches 16 and 17 to the wheel brake cylinders 18 and 19 of the wheel brakes 20 and 21 by the displacement of quantities of pressure fluid. The first control valve 25 assumes its position 25a in this process; because of the brake pressure in the brake line 15 transmitted through the first control line 49 to the actuating means 48, the second control valve 42 assumes the position 42a, and the pressure control valve assemblies 70, 71 assume their positions 70a and 71a. Correspondingly, the brake pressure becomes operative in the brake circuit II that is not shown.

When the brake pedal 11 is released, quantities of brake fluid from the wheel brake cylinders 18, 19 are returned to the master brake cylinder 12 through the brake line branches 16, 17 and the brake line 15, and the brake pressure is reduced.

If in this kind of brake actuation the control unit 89 recognizes from signals of the rpm sensor 90, for instance, that the vehicle wheel assigned to the wheel brake 20 is threatening to lock, then it switches the pressure control valve assembly 70 from the position 70a for pressure buildup to the position 70b for pressure holding or the position 70c for pressure reduction in the wheel brake cylinder 18. At the same time, the control unit 89 turns on the drive motor 61 of the pump 46, so that the pump, in the pressure reduction position 70c of the pressure control valve assembly 70, aspirates pressure fluid from the wheel brake cylinder 18 through th return line branch 83 and the return line 84 and pumps it through the feed line 63 into the brake line 15 to the master brake cylinder 12. The alternation among pressure buildup, pressure holding and pressure reduction in the wheel brake cylinder 18 continues as long as the unstable state of the vehicle wheel associated with the wheel brake 20 continues.

Contrarily, if upon startup and acceleration of the vehicle the vehicle wheel associated with the wheel brake 20 spins, for instance, the control unit 89 again recognizes this from the signals output by the rpm sensor 90, and it switches the first control valve 25 into the position 25b. In this valve position 25b, the communication between the pump 46 and the master brake cylinder 12 is interrupted, but the communication between the pump 46 and the actuating means 52 of the second control valve 42 is established, via the overflow line 30, the compensation line 38 and the second control line 53. Since upon vehicle startup and acceleration the brake pedal 11 of the master brake cylinder 12 is not actuated, no pressure prevails in either the brake line 15 or the first control line 49 to the actuating means 48 of the second control valve 42. If loss of traction occurs, the control unit 89 also turns on the drive motor 61 of the pump 46. The pump aspirates a small quantity of pressure fluid from the lines connected to its inlet side, such as the intake line segment 47 return line 84 and return line branches 83 and 85. Despite the fact that the second control valve 42 assumes its blocking position 42a, and that the pressure control valve assemblies 70 and 71 assume their basic positions 70a and 71a, in which the third connection 82 is blocked, the aspiration of pressure fluid is still possible because the pressure fluid located in these lines, when negative pressure occurs, give off dissolved gas thereby making intake volume available.

With this small quantity of pressure fluid, the self-aspirating pump 46 generates a pressure pulse, which acts, through the feed line 63, the brake line segment 28, the overflow line 30, the outlet line 38, and the control line 53, upon the actuating means 52 of the second control valve 42 and switches this valve into its open position 42b. The pump 46 can now aspirate pressure fluid from the pressure fluid supply tank 13 of the master brake cylinder 12 through the intake line 34, and can feed it through the brake line branch 16 with the pressure control valve 70 that assumes its position 70a into the wheel brake cylinder 18 of the wheel brake 20, in order to build up pressure therefore braking the slipping vehicle wheel. The pressure control valve 71 of the vehicle wheel that is not slipping is switched by the control unit 89 to position 71b, to prevent braking of this wheel.

To reduce the pressure in the wheel brake cylinder 18 once the vehicle wheel is stabilized, the control unit 89 switches the pressure control valve assembly 70 to its position 70c, so that the pump 46 can aspirate pressure fluid from the wheel brake cylinder 18 and pump it back into the pressure fluid supply tank 13, overcoming the pressure-limiting means 35 in the overflow line 30. Once traction control operation has been completed, the control unit 89 turns off the drive motor 61 of the pump 46, and switches over the first control valve 25 to its position 25a and the pressure control valve assemblies 70 and 71 to their basic positions 70a and 71a. Pressure present at the actuating means 52 of the second control valve 42 can decrease by entering the pressure fluid supply tank 13, via the second control line 53, and via the compensation line 38 and the throttle 39 located in it. The second control valve 42 now assumes its blocking position 42a, because of the action of the actuating spring 51 or as a result of the pressure pulse acting upon the actuating means 48 upon the next braking operation initiated by the driver.

When the anti-skid and traction control apparatus 24 is tested, an operation tripped by the control unit 89, and in vehicle operation, situations arise in which the drive motor 61 of the pump 46 is set into operation. In these situations, however, the control unit 89 does not switch the first control valve 25 into its position 25b, so that no pressure pulse for switching the second control valve 42 over to its open position 42b can be transmitted. The pump 46 is therefore unable to aspirate pressure fluid from the pressure fluid supply tank 13 and pump it into the unactuated master brake cylinder 12. As a result, no disruptive noise can be developed in the master brake cylinder 12.

Since the pressure fluid located in the lines 47, 83, 84, 85 on the intake side has lost its fluid content after repeated startups of the pump 46 caused in this way, a situation can arise in the traction control mode in which the pump 46 cannot generate any pressure pulse for switching the second control valve 42 into its open position 42b. Provisions are therefore made in the control unit 89 so that after a pump operation with the aspiration of pressure fluid from the segment 47 of the intake line 34 extending from the inlet side 59 of the pump 46 toward the second control valve 42, which assumes its blocking position 42a, and from the return line 84 and the return line branches 83 and 85 sealed off on the side of the wheel brake, at least one of the pressure control valve assemblies 70 and 71 is switched briefly into its pressure reduction position 70c and 71c, respectively, in which at least one wheel brake cylinder 18 or 19 is connected to the inlet side 59 of the pump 46. The negative pressure in the aforementioned lines 47, 84, 83, 85 aspirates pressure fluid, which has the necessary gas content, from the wheel brake cylinder 18 or 19 into the aforementioned lines.

In FIG. 2 of the drawing, a first exemplary embodiment for the second control valve 42 disposed in the intake line 34 to the vehicle brake system 10 is shown in simplified form. The control valve 42 has valve housing 100 with a stepped housing bore 101. A longitudinally movable stepped piston 102 is received in this bore, and its first piston part 104, guided longitudinally tightly in the bore segment 103 of larger diameter, has two operative faces 105 and 106. The stepped piston 102 acts as the actuating means 48 and 52 of the second control valve 42. The bore segment 103 of larger diameter serves as a control chamber 107, the portion 108 of which, bordering the larger operative face 105 of the piston part 104, communicates with a connection 109 for the first control line 49. The actuating spring 51, embodied as a compression spring 110, can be disposed in this control chamber part 108. A control chamber part 111 bordering the smaller operative face 106 of the piston part 104 contrarily communicates with a connection 112 for the second control line 53.

The stepped piston 102 has second piston part 115 coaxially beginning at the smaller operative face 106 of the piston part 104 and engaging a segment 116 of smaller diameter of the housing bore 101. This bore segment 116 serves as a work chamber 117 for the second control valve 42. The work chamber 117 communicates with the connection 43 for the intake line segment 44 toward the tank. A spherical closing body 118 of a seat valve 119 is received in the work chamber 117. This closing body 118 is joined to the piston part 115 via a tappet 120. The work chamber 117 ends at a valve seat 121, incorporated into the bore portion 116, of the seat valve 119. Toward the valve seat, the bore segment 116 merges with the connection 45 for the intake line segment 47 toward the pump.

The larger operative face 105 is exposed to the pressure generated upon actuation of the brake pedal 11 in the master brake cylinder 12, and this pressure switches the control valve 42 to its blocking position 42a, shown. As noted, this switching position can also be generated by the force of the actuating compression spring 110 in the control chamber part 108. The pump pressure acting upon the smaller operative face 106 through the second control line 53, contrarily, is capable of opening the seat valve 11 and switching the second control valve 42 into its open position 42b, in which there is communication between the connection 43 and the connection 45.

The piston part 115 of smaller diameter, beginning at the smaller operative face 106 of the piston part 104 of the stepped piston 102 has a diameter smaller than the diameter of the bore segment 116, so that there is a gap 125 of a defined size between the circumference of this piston part 115 and the circumference of the segment 116 of the housing bore 101. The gap 125 acts as a throttle 39 and compensation line 38, through which the pump pressure prevailing in the control chamber part 111 and fed in from the control line 53 and the connection 112 can decrease, via the work chamber 17 and the connection 43 to the pressur fluid supply tank 13.

The second exemplary embodiment of the second control valve 42 shown in FIG. 3 differs from the embodiment of FIG. 2 essentially in that the second piston part 115, having the smaller diameter, engages the segment 116 of smaller diameter forming the work chamber 117 in a pressure-fluid-tight manner, and that the compensation line 38 and the throttle 39 are disposed inside the piston part 115. The stepped piston 102 in fact has a continuous longitudinal bore 130, which is closed in the region of the larger-diameter piston part 104 by a pressed-in ball 131. The longitudinal bore 130 is intersected by a transverse bore 132, which discharges into the control chamber part 111 that can be acted upon by pump pressure. In a deviation from the exemplary embodiment shown, it also suffices if the longitudinal bore 130 begins at the end face 133 toward the work chamber and ends after the entry into the transverse bore 132.

A cartridge-like insert 136 having an opening 137 acting as a throttle 139 is pressed into the longitudinal bore 130. A filter insert 138 is also fitted into the longitudinal bore 130 between the throttle insert 136 and the transverse bore 132. The pump pressure in the control chamber part 111 can be reduced via the transverse bore 132, acting as the compensation line 38, and longitudinal bore 130 and via the opening 137, acting as a throttle 39, of the throttle insert 136 and the work chamber 117 communicating with the intake line 34.

The foregoing relates to a preferred exemplary embodiment of the invention, it being understood that other variants and embodiments thereof are possible within the spirit and scope of the invention the latter being defined by the appended claims.

What is claimed and desired to be secured by Letters Patent of the United States is:

1. A hydraulic vehicle brake system (10) having an anti-skid and traction control apparatus (24) for driven vehicle wheels having first (18) and second (19) wheel brake cylinders, having a pedal which actuates a master brake cylinder (12) having a pressure fluid supply tank (13) and a main brake line (15) that branches off from said master brake cylinder to supply brake fluid to the first and second wheel brake cylinders (18 and 19);

a first and second pressure control valve assemblies (70 and 71), said first pressure control valve assembly includes a first connection connected with a first brake line branch (16) connected with said main brake line (15) and said second pressure control valve assembly includes a second connection connected with a second brake line branch (17) connected to said main brake line (15), for pressure buildup, pressure holding and pressure reduction in the first wheel brake cylinder (18), said first pressure control valve assembly has a third connection that communicates with the first wheel brake cylinder (18), said second pressure control valve assembly has a fourth connection that communicates with the second wheel brake cylinder (19), said first pressure control valve assembly has a fifth connection to a third branch line (83), through which quantities of pressure fluid flow in an anti-skid mode and in a traction control mode, said second pressure control valve assembly has a sixth connection to a fourth branch line (85) through which quantities of pressure fluid flow in an anti-skid mode and in a traction control mode, a self-aspirating pump (46) having an inlet side (59) which communicates with said third and fourth branch lines of the first and second pressure control valve assemblies (70 and 71) via a line (84) and with the pressure fluid supply tank (13) via an intake line (34), and an outlet side (62) of said pump communicates with the main brake line (15), a first control valve (25), located in the main brake line (15) between the master brake cylinder (12) and a connection (64) of a feed line (63) from the outlet side (62) of the pump, said first control valve has a spring-actuatable first position (25a), in which the master brake cylinder communicates with the first and second pressure control valve assemblies (70 and 71), and a second position (25b), electromagnetically switchable in the traction control mode in accordance with a predetermined control algorithm stored in a control unit (89), in said second position of said first control valve a segment (28) of the main brake line (15) on the outlet side of the pump communicates with the pressure fluid supply tank (13) via an overflow line (30) that contains a pressure-limiting means (35) therein;

a second control valve (42) disposed in the intake line (34) of the pump (46), said second control valve is switched into an open position (42b) by actuating means (48, 52) and into a blocking position (42a) by fluid pressure which is created by pedal actuation and which prevails in the main brake line (15) between the master brake cylinder (12) and the first control valve (25) which is connected to said actuating means (48), a control line (53) that communicates with the overflow line (30) and leads to the actuating means (52) of the second control valve (42), by means of which said control line pressure generated by the pump (46) is transmitted for switching the second control valve into said open position (42b);

a compensation line (38) including a throttle therein, said compensation line begins at the overflow line (30) between the first control valve (25) and the pressure-limiting means (35) which leads to a segment (44) of the intake line (34) between said second control valve and said pressure fluid supply tank and which connects with said segment (44) to said pressure fluid supply tank.

2. A hydraulic vehicle brake system as defined by claim 1, in which the second control valve (42) is a 2/2-way valve, embodied as a seat valve (119), having a stepped piston (102), serving as said actuating means (48, 52), that is longitudinally movable in a control chamber (107) of a stepped housing bore (101), said stepped piston includes a large area operative face (105) which is exposed to a pressure resulting from pedal actuation as well as to a force of a compression spring (110), and a smaller area operative face (106) which is exposed to the pressure generatable by the pump (46).

3. A hydraulic vehicle brake system as defined by claim 2, in which the second control valve (42) has a work chamber (117) that communicates with the intake line (34), said work chamber is engaged by a piston part (115) beginning at a smaller operative face (106) of the stepped piston (102), and a gap (125) between a circumference of the piston part and the housing bore (101) that acts as a throttle and which forms a portion of the compensation line (38).

4. A hydraulic vehicle brake system as defined by claim 2, in which the second control valve (42) has a work chamber (117) that communicates with the intake line (34), said work chamber is engaged in a pressure-fluid-tight manner by a piston part (115) beginning at said smaller area operative face (106) of the stepped piston (102); that the stepped piston has a longitudinal bore (130), which beings at an end face (133) toward the work chamber and ends in a transverse bore (132), which discharges into a control chamber part (111) that is acted upon by pump pressure of said self-aspirating pump (46); and that said throttle and a filter insert (138) are disposed in the longitudinal bore.

5. A hydraulic vehicle brake system as defined by claim 1, in which after the control unit (89) initiates a pump startup with an aspiration of pressure fluid from a segment (47) of the intake line (34) that extends from the inlet side (59) of the pump (46) toward the second control valve (42), said second control valve (42) assumes said blocking position (42a), and said control unit switches at least one of the pressure control valve assemblies (70 and 71) into a pressure reduction position (70c, 71c), in which one of said wheel brake cylinders (18, 19) communicates with the inlet side of the pump.

* * * * *